H. J. GOODMAN.
MOTORCYCLE TENDER.
APPLICATION FILED JAN. 24, 1921.

1,383,933.

Patented July 5, 1921.
2 SHEETS—SHEET 1.

Witnesses
E. Q. Ruppert.
U. B. Hillyard.

Inventor
Harry J. Goodman
By Victor J. Evans
Attorney

H. J. GOODMAN.
MOTORCYCLE TENDER.
APPLICATION FILED JAN. 24, 1921.
1,383,933.
Patented July 5, 1921.
2 SHEETS—SHEET 2.
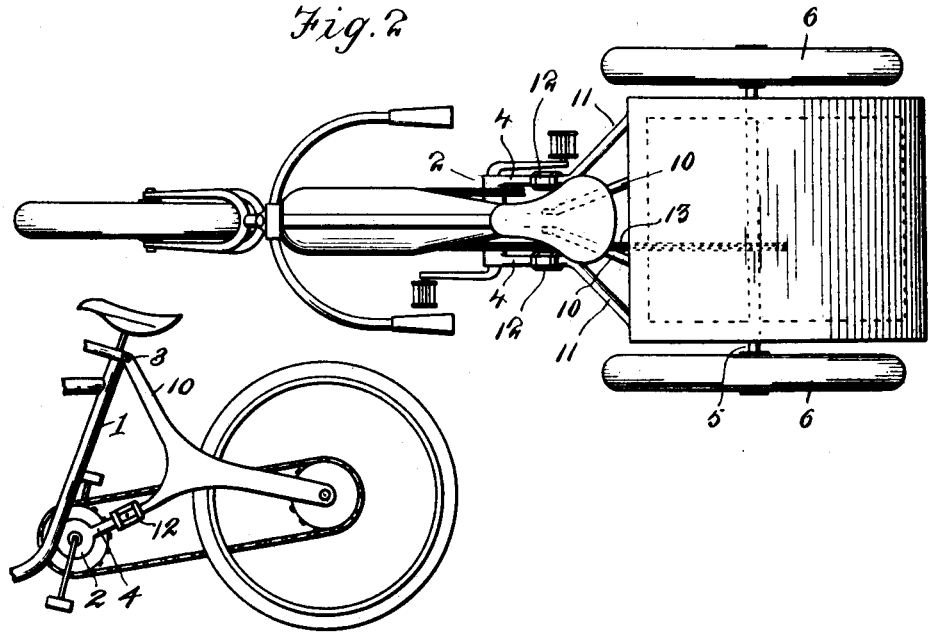
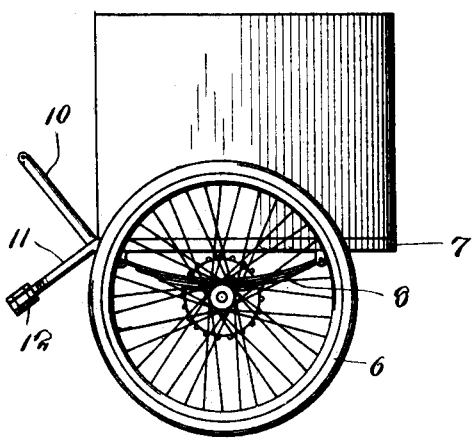
Inventor
Harry J. Goodman
Witnesses
E. R. Ruppert.
U. B. Hillyard.
By Victor J. Evans
Attorney

UNITED STATES PATENT OFFICE.

HARRY J. GOODMAN, OF CHICAGO, ILLINOIS.

MOTORCYCLE-TENDER.

1,383,933.      Specification of Letters Patent.      Patented July 5, 1921.

Application filed January 24, 1921. Serial No. 439,702.

*To all whom it may concern:*

Be it known that I, HARRY J. GOODMAN, a citizen of the United States, residing at Chicago, in the county of Cook and State of Illinois, have invented new and useful Improvements in Motorcycle-Tenders, of which the following is a specification.

The primary object of the invention is the provision of a luggage carrier for vehicles generally and for motorcycles in particular, said luggage carrier being in the nature of an attachment adapted to be readily coupled to or disconnected from the main frame of the machine, thereby admitting of the latter being used for the primary purpose for which desired; namely, to carry the rider, simply, to be used in the capacity of a carrier for one or more passengers, or for transporting merchandise or other articles.

The invention provides a truck which is adapted to be coupled to or uncoupled from the main frame of the machine, said truck being provided with a body according to the specific use for which the attachment is designed. As a luggage carrier the body will be in the nature of a box for receiving sundry articles and packages. It is to be understood that the body may assume various forms according to the specific adaptation of the invention, the same readily suggesting themselves to one skilled in the art when adapting the invention to meet a particular requirement.

The invention consists of the novel features, details of construction and combination of parts, which hereinafter will be more particularly set forth, illustrated in the accompanying drawings, and pointed out in the appended claim.

Referring to the drawings forming a part of the specification,

Fig. 2 is a top plan view.

Fig. 4 is a view of the attachment disassociated from the machine.

Fig. 5 is a view of the wheel attachment associated with the machine.

Corresponding and like parts are referred to in the following description, and indicated in all of the views of the drawing, by the same reference characters.

Figure 1:
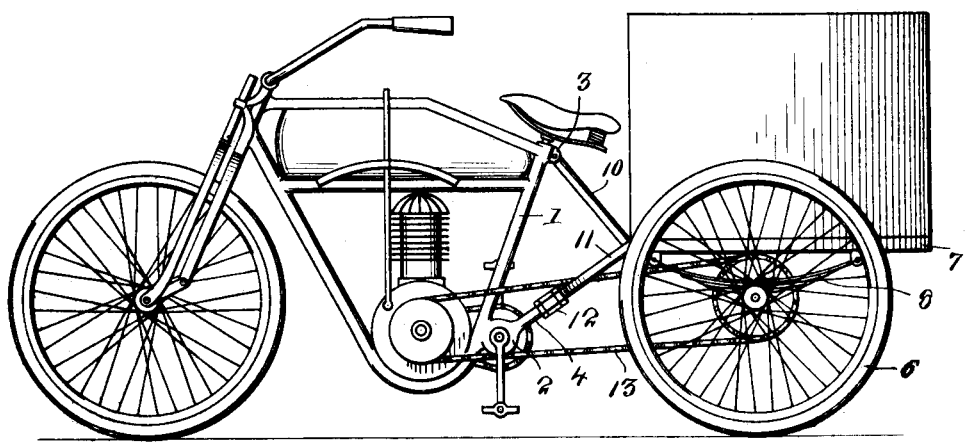
Figure 1 is a view in elevation of a motorcycle provided with an attachment embodying the invention.
Figure 3:
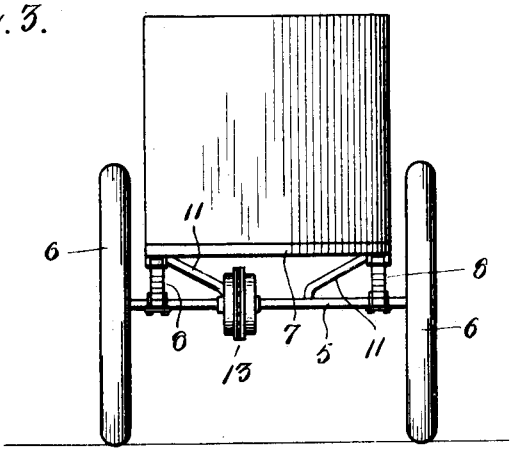
Fig. 3 is a rear view.

The motorcycle illustrated has been selected to demonstrate the adaptation of the invention since it is typical of the type for which the invention is designed. It is to be understood that the machine may be propelled by power of any nature and inasmuch as the invention is particularly adapted for motor driven cycles this type has been selected for illustrating the application of the invention. The main frame of the cycle embodies a seat post tube 1 and crank hanger 2. The seat post tube is usually provided at its upper end with rear extensions 3 to which the attachment fork is attached. In the present instance the crank hanger is provided with lower rear extensions 4 which may constitute parts of the lower members or bars receiving and supporting the usual axle of the rear drive wheel. These extensions 4 are necessary in order to adapt the cycle for receiving the attachment and enabling the machine to be converted from one specific form to another—*i. e.*, from the form shown in Fig. 1 to that shown in Fig. 5 and vice versa.

The attachment comprises a truck which is adapted to receive a body of particular construction to meet the specific needs of the invention when adapting the same for a particular use. As a luggage carrier the body of the attachment will partake of the nature of a box in order to receive packages and other articles. If the body is to be designed for carrying passengers or receiving implements of warfare the construction is varied according to the specific requirement. The truck comprises an axle 5, wheels 6 and a platform 7. Suitable springs 8 are interposed between the platform 7 and axle 5 to relieve the body of shock and jar. The platform 7 which may be of any construction, is provided with forwardly extending members 10 and 11, fixed to or integral with the platform. The members 10 incline upwardly and forwardly and come together at their upper ends between the lugs 3 to which they are bolted or otherwise secured. The members 11 are disposed in substantially parallel relation one with the other and are connected to the rear extensions 4 by suitable couplings 12. It is to be understood that the connecting means between the members 10 and 11 and the machine frame of the cycle must be such as to admit of the attachment being readily connected to or disconnected from the machine frame and to provide substantial and reliable joints when the attachment is in position. This construction admits of the machine being used in the ordinary manner for carrying the rider solely or to be converted as a carrier for merchandise, passengers or an armament. It will be noted that the wheel attachment as shown in Fig. 5 of the drawing is provided with substantially the identical connection as that above described, for connecting the truck with the rear portion of the machine and it is thought that further description of this connecting means is not necessary.

From the foregoing description, taken in connection with the accompanying drawings, the advantages of the construction and of the method of operation will be readily apparent to those skilled in the art to which the invention appertains, and while I have described the principle of the operation of the invention, together with the device which I now consider to be the best embodiment thereof, I desire to have it understood that the device shown is merely illustrative, and that such changes may be made when desired as are within the scope of the claim appended hereto.

The wheels 6 are used as drivers in substantially the same manner as the drive wheels of a motor vehicle, and any suitable transmission may be interposed between the engine and the drive axle, a chain 13 being shown.

Having described my invention, what I claim and desire to secure by Letters-Patent, is:—

In a machine of the type specified embodying a main frame having upper and lower rear extensions, a truck, transversely spaced upper and lower members projecting forwardly from the truck, said upper members converging at their front ends and rigidly secured to the upper rear extension of the main frame, and coupling means rigidly connecting the lower members to the lower rear extensions of the main frame.

In testimony whereof I do affix my signature.

HARRY J. GOODMAN.